United States Patent Office 3,100,867
Patented Aug. 13, 1963

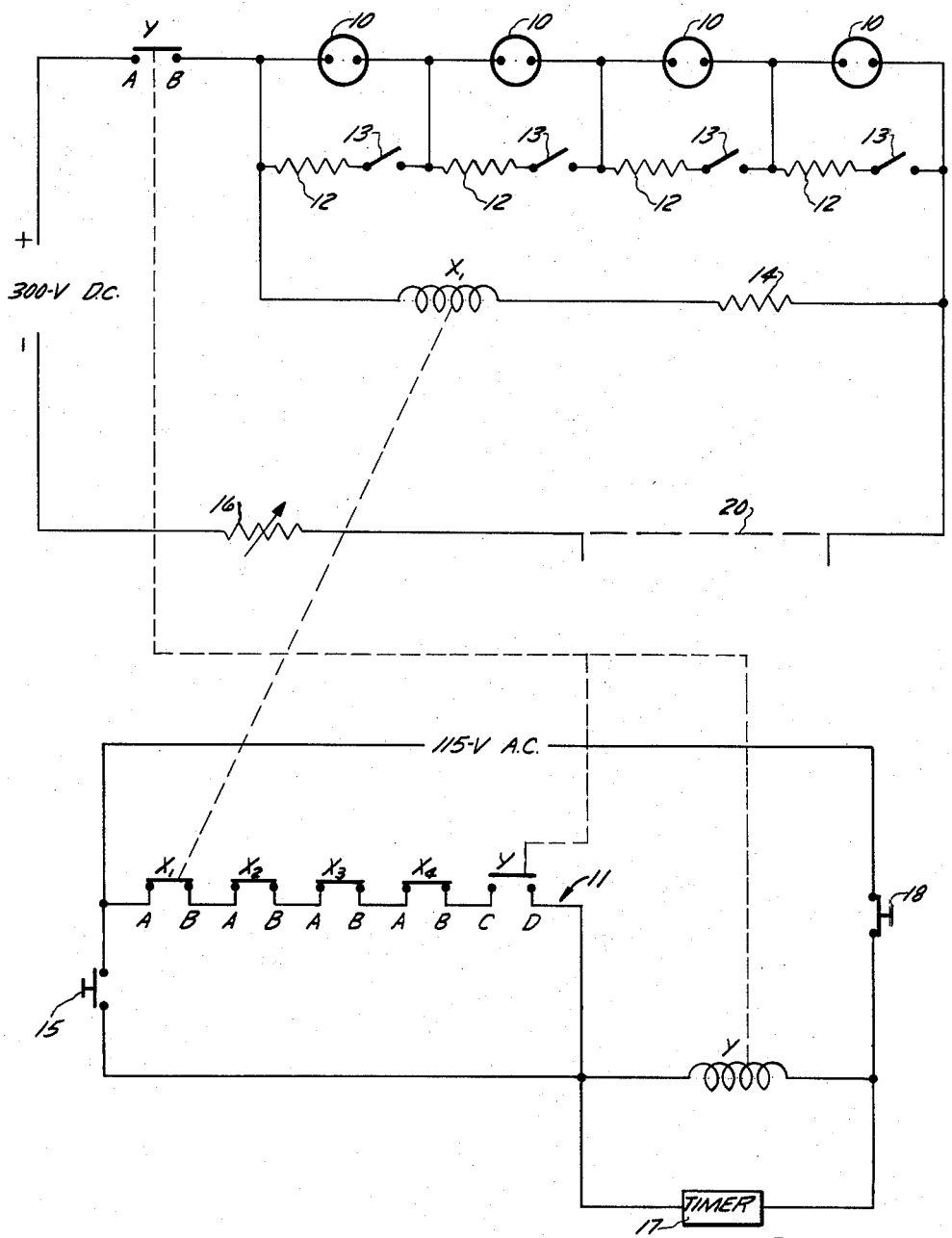

3,100,867
GAS TUBE LIFE TESTER
Stephen A. Myslinski, Reading, Pa., assignor to Western Electric Company, Incorporated, a corporation of New York
Filed May 4, 1961, Ser. No. 107,717
4 Claims. (Cl. 324—24)

This invention relates to an arrangement for testing electronic devices and particularly to an arrangement for testing the lifetime of a gas tube, such as a gas diode.

In the manufacture of gas tubes, tube life is usually tested by connecting a plurality of tubes in a series circuit and impressing a predetermined voltage across the tubes to obtain an arc condition therein, the life cycle of a tube being measured during that condition and terminating when a tube changes to a glow condition.

Heretofore, inaccurate measurements were obtained when an operator was not present to note the exact time that a tube changed to a glow condition. Further, when the tube changed to a glow condition, a voltage increase occurred in the series circuit which produced a current decrease across the other tubes being tested, thereby causing an inefficient testing of the other tubes. Also, at times, the continued increased power supplied to the tubes in a glow condition produced a safety hazard in that such tubes had a tendency to explode when overloaded.

The object of this invention is to provide a circuit for testing the life of tubes in a safe and accurate manner.

According to the general features of this invention, a glow detecting circuit is employed wherein a group of gas tubes under a life test is connected in series across a relay. When a tube goes from the arc to glow condition, the relay is operated, due to a resultant increase in voltage, to cut the power supply to the detecting circuit as an indication that a glow condition has been encountered.

A feature of this invention is the automatic opening of a test circuit when a tube has gone from the arc to glow condition.

Another feature of the invention is the automatic accurate recording of the life cycle of a tube.

Other objects will be apparent and a fuller understanding of the invention may be had by referring to the following description and claims taken in conjunction with the accompanying drawing in which The single FIGURE is a diagrammatic view of a portion of the test circuit for practicing one embodiment of the invention, and includes a holding circuit for switching the power supply thereto.

Referring now in detail to the drawing, a group of four tube sockets 10 is connected in series with the normally open contacts A—B of a relay Y located in its own holding circuit 11, relay Y also having normally open contacts C—D in circuit 11. In practice, there are three similar groups of sockets indicated by the dotted line 20 in series with the group shown. A 25-ohm resistor 12 is connectible across each tube socket 10 by means of a manually controlled switch 13 which is closed when a tube is not inserted in the socket. The test circuit also includes a relay $X_1$ connected in series with a resistor 14 across the four-tube socket group, relay $X_1$ having normally closed contacts A—B in the holding circuit. Normally closed contacts A—B for relays $X_2$, $X_3$ and $X_4$ of the other aforementioned tube groups (not shown) are connected in series in the holding circuit 11 of relay Y.

In operation, each tube is inserted in its socket 10 and a momentary start switch 15 is then operated for energizing relay Y to close its contacts A—B, thereby permitting power to be supplied to the test circuit. Simultaneously, relay Y is sealed in the holding circuit 11 by its own contacts C—D. The switches 13, across each socket 10, are opened one at a time to remove their corresponding resistor 12 from the series circuit, each inserted tube now taking the place of a resistor.

Each tube is instantaneously fired by the initial application of 300 volts from the source but immediately passes through a glow to an arc condition when the voltage drops to approximately 16 volts, the normal arc voltage of each tube. In the event that each socket is loaded with a tube, the series voltage of the four tubes in a group, while in the arc condition, is 64 volts. This series voltage is applied across the coil of relay $X_1$ and the 24K-ohm resistor 14 in series therewith, relay $X_1$ requiring a total of 84 volts to operate.

When one of the tubes goes into the glow condition, its voltage increases from 16 to 80 volts, the normal glow voltage. The instant this happens, the total series voltage of the four-tube group increases from 64 volts to 128 volts, a voltage in excess of 84 volts and therefore sufficient to energize relay $X_1$ which opens its contacts A—B in the holding circuit 11 of relay Y. Upon the opening of the relay $X_1$ contacts, relay Y is de-energized causing the contacts A—B in the test circuit to open and thereby cut off the power supply.

A timer 17 is in the relay Y circuit and commences to run when relay Y is energized, the timer stopping when the circuit is opened. In this manner the life of the tube is automatically recorded. If desired, an alarm, such as a light or bell, can be included in the circuit for signalling the operator that a tube has gone to the glow condition.

In the event that it is desired to open the test circuit at any particular time, a normally closed stop switch 18 is provided in the relay Y circuit which, when operated, de-energizes relay Y to open its contacts A—B in the test circuit.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An arrangement for testing the lifetime of a gas tube wherein the tube passes from an arc to a glow condition which comprises a test circuit having a power supply, a group of tube sockets connected in series in said circuit for receiving tubes therein, a resistor connected across each tube socket, a switch for removing each resistor from the series circuit upon the insertion of a tube into its corresponding socket, a holding circuit, a relay in said holding circuit, means for energizing the holding circuit relay to permit the passage of a first predetermined power from the power supply to the tubes to place the tubes in the arc condition, a relay having contacts in the holding circuit and connected in series with the power supply and in parallel with the tube group, said tube group relay operable upon a voltage in excess of the voltage across the tubes when all the tubes are in an arc condition to indicate a tube has passed from the arc to the glow condition, and means responsive to the operation of said tube group relay for de-energizing the holding circuit relay to cut off the power supply to the testing circuit.

2. An arrangement for testing the lifetime of a gas tube wherein the tube passes from an arc to a glow condition which comprises a testing circuit having a power supply, a group of tube sockets connected in series in said circuit for receiving tubes therein, a resistor connected across each tube socket, a switch for removing each resistor from the series circuit upon the insertion of a tube into its corresponding socket, a holding circuit, a relay in said holding circuit having contacts in the testing circuit, means for energizing the holding circuit relay to activate its contacts in the testing circuit to permit the passage of a first predetermined power from the power supply to the tubes to place the tubes in the arc condition, and a relay having contacts in the holding circuit and connected in series with the power supply and in parallel with the tube group, said tube group relay operable upon a voltage in excess of the voltage across the tubes when all the tubes are in an arc condition to indicate a tube has passed from the arc to the glow condition, the operation of the tube group relay causing the holding circuit relay to de-energize and deactivate its contacts in the testing circuit to cut off the power supply thereto.

3. An arrangement according to claim 2 in which the indicating means is a timer for recording the lifetime of the tube in the arc condition.

4. An arrangement for testing the lifetime of a tube wherein the tube passes from an arc to a glow condition which comprises a testing circuit having a power supply, a group of tube sockets connected in series in said circuit for receiving tubes therein, a resistor connected across each tube socket, a switch for removing each resistor from the series circuit upon the insertion of a tube into its corresponding socket, said inserted tube taking the place of a resistor, a holding circuit, a relay in said holding circuit, means for energizing the holding circuit relay to permit the passage of a first predetermined power from the power supply to the tubes to place the tubes in the arc condition, a relay having contacts in the holding circuit and connected in series with the power supply and in parallel with the tube group, said tube group relay being operable upon a voltage in excess of the voltage across the tubes when all tubes are in an arc condition to indicate a tube has passed from the arc to the glow condition, and means responsive to the operation of the tube group relay for indicating the passage of a tube from the arc to the glow condition.

References Cited in the file of this patent
UNITED STATES PATENTS 2,424,275    Hansen et al. _____ July 22, 1947